United States Patent [19]
Raskob, Jr.

[11] Patent Number: 5,901,928
[45] Date of Patent: *May 11, 1999

[54] ACTIVE TURBULENCE CONTROL TECHNIQUE FOR DRAG REDUCTION

[75] Inventor: Anthony William Raskob, Jr., Colorado Springs, Colo.

[73] Assignee: Aptek, Inc., Colorado Springs, Colo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/664,395

[22] Filed: Jun. 14, 1996

[51] Int. Cl.$^6$ .................................................. B64C 21/10
[52] U.S. Cl. ........................................... 244/204; 244/130
[58] Field of Search ................................... 244/198, 199, 244/200, 201, 204, 130

[56] References Cited

U.S. PATENT DOCUMENTS

| | | | |
|---|---|---|---|
| 3,612,446 | 10/1971 | Lebert | 244/200 X |
| 4,170,185 | 10/1979 | Murphy et al. | |
| 4,516,747 | 5/1985 | Lurz | 244/130 X |
| 4,654,546 | 3/1987 | Kirjavainen | |
| 4,697,769 | 10/1987 | Blackwelder et al. | 244/199 |
| 4,741,498 | 5/1988 | Gerhardt | 244/130 |
| 4,885,783 | 12/1989 | Whitehead et al. | |
| 4,989,810 | 2/1991 | Meier et al. | 244/208 |
| 5,114,099 | 5/1992 | Gao | 244/200 X |

FOREIGN PATENT DOCUMENTS

| | | | |
|---|---|---|---|
| 452986 | 11/1948 | Canada | 244/200 |

OTHER PUBLICATIONS

Riblets, chapter from, "Viscous Drag Reduction in Boundary Layers", Michael J. Walsh; vol. 123, Progress in Astronautics and Aeronautics.

"Compliant Wall–Turbulence Skin–Friction Reduction Research"; Michael C. Fischer, Leonard M. Weinstein, Robert L. Ash and Dennis M. Bushnell; presented at the AIAA Eighth Fluid and Plasma Dynamics Conference.

"Suppression of Turbulence in Wall–Bounded Flows by High–Frequency Spanwise Oscillations"; W.J. Jung, N. Mangiavacchi and R. Akhaven; Phys. Fluids A 4(8); Aug. 1992.

"Turbulent Burst Control Through Phase–Locked Traveling Surface Depressions"; S.P. Wilkinson; R. Balasubramanian; presented at the AIAA Shear Flow Conference Mar. 12–14, 1985.

"Effect of Driven–Wall Motion on a Turbulent Boundary Layer" Leonard M. Weinstein; Reprinted from "Unsteady Turbulent Shear Flows"; 1981.

"Turbulence reduction in a Boundary Layer by a Local Spanwise Oscillating Surface", F. Laadhari and R. More; Phys. Fluids, vol. 6, No. 10; Oct. 1994.

*Primary Examiner*—Charles T. Jordan
*Assistant Examiner*—Christopher K. Montgomery
*Attorney, Agent, or Firm*—John R. Ley

[57] ABSTRACT

A method of disrupting a turbulent region of a boundary layer within a fluid flow passing over a surface to decrease momentum transfer, and thus friction drag, between the turbulent flow and the surface. Bending waves are generated on the surface to impose velocity and/or pressure oscillations within the turbulent region and disrupt the normal turbulent process within the boundary layer, thereby decreasing the transfer of momentum from the turbulent flow to the surface. The bending waves are preferably generated in a predominantly spanwise or normal direction relative to the streamwise fluid flow. In another embodiment, the bending waves enhance the turbulent process and increase the transfer of momentum between the turbulent flow and the surface. Bending wave actuators may bend the surface to generate bending waves within the surface itself. In another embodiment, actuators may generate bending waves within a separate material attached to the surface. Bending waves may also be generated within a laminar region of the boundary layer to trip the laminar region to turbulent flow and thereby energize the boundary layer.

35 Claims, 5 Drawing Sheets

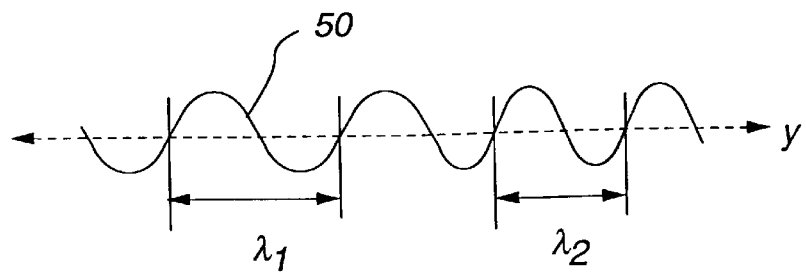
FIG. 5
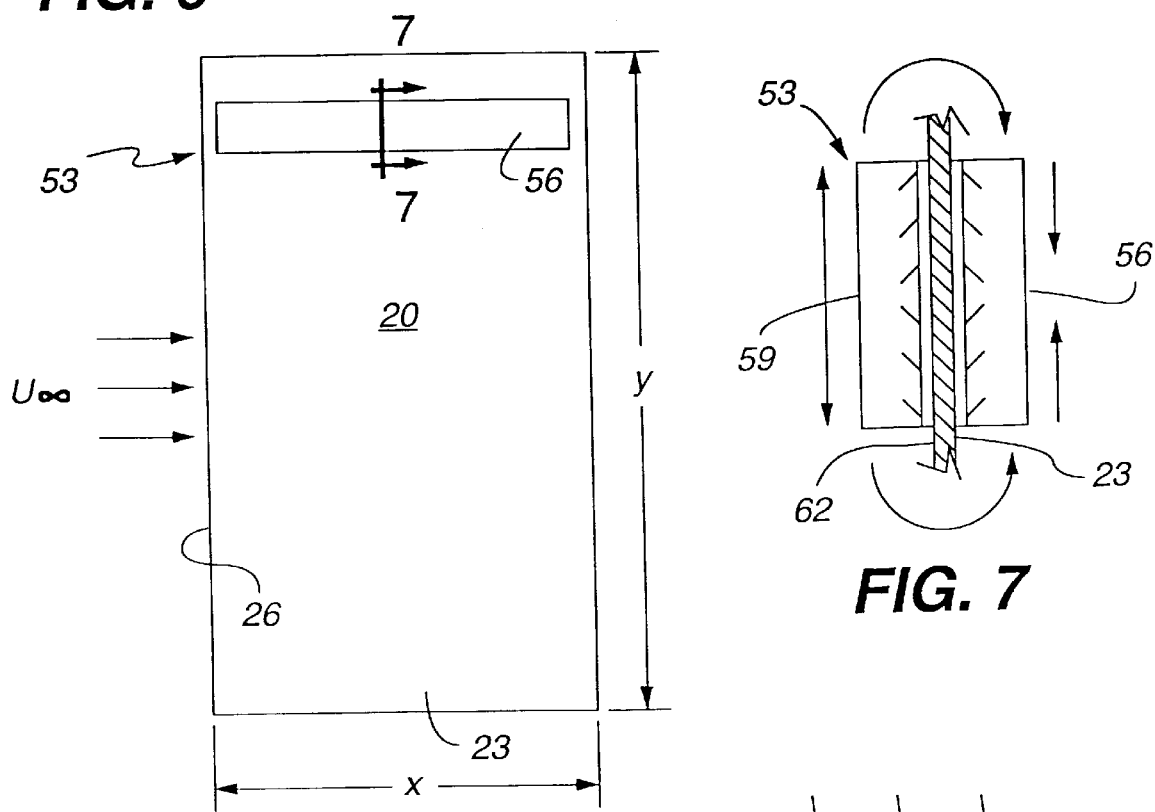
FIG. 6
FIG. 7
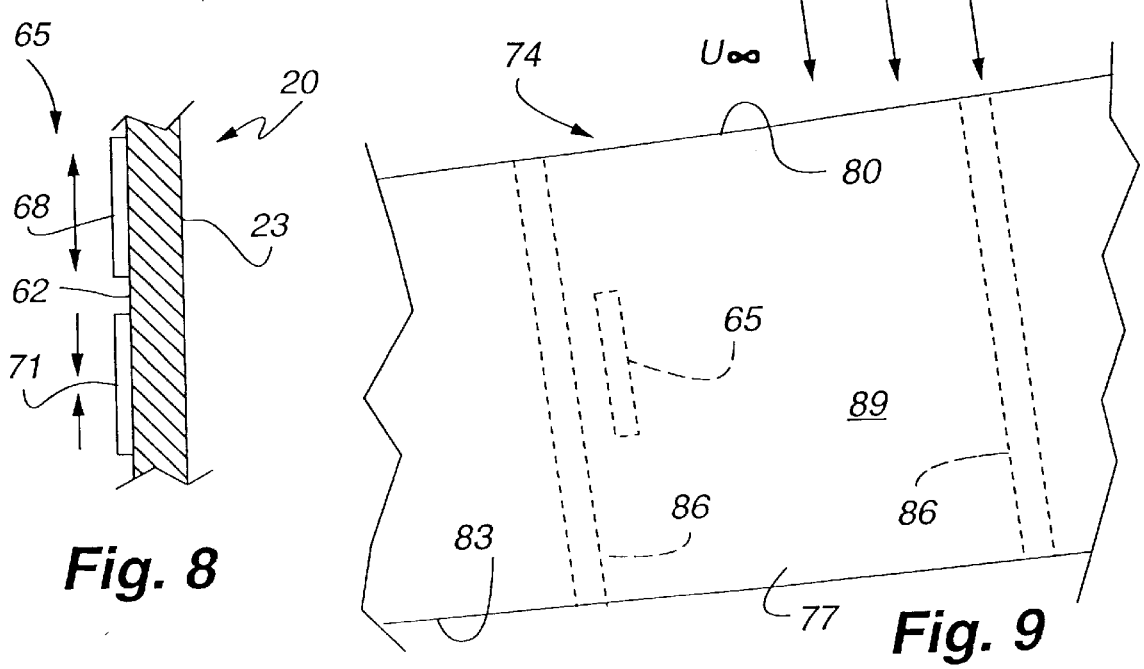
Fig. 8
Fig. 9

ACTIVE TURBULENCE CONTROL TECHNIQUE FOR DRAG REDUCTION

This invention was made with U.S. Government support under SBIR contract F33615-94-C-3005 awarded by the U.S. Air Force. The U.S. Government has certain rights in the invention.

FIELD OF THE INVENTION

This invention relates generally to active techniques for reducing drag forces on a solid surface within a fluid flow. More particularly, the present invention relates to a new and improved method and apparatus for transmitting bending waves in a substantially spanwise direction along a surface within a fluid flow to modify the usual turbulent processes within the turbulent region of the boundary layer adjacent to the surface, and thereby reduce the transfer of momentum between the boundary layer and the surface.

BACKGROUND OF THE INVENTION

Friction drag and pressure drag are persistent problems in aerodynamic and other types of fluid flow design. Friction drag results primarily from the force of friction between a surface such as a wing or a fuselage section and the air or other fluid found within the boundary layer adjacent to that surface. When the fluid flow past the surface is laminar, the effect of friction drag is relatively small. However, when a turbulent fluid flow passes over the surface, the frictional drag force is typically much larger than with the laminar flow. With respect to modern aircraft, the frictional drag component can account for 50% or more of the total drag force experienced by such aircraft. Similarly, other aerodynamic or hydrodynamic structures (e.g., cars, ships, rockets, etc.) may experience large frictional drag forces due to turbulent flow passing over their external surfaces.

A second type of drag occurs when a flow over an aerodynamic or other surface separates from that surface to create a low pressure pocket behind the surface. Such flow separation may be caused when the aerodynamic surface interacts with the flow at a high angle of incidence or "angle of attack." The resulting low pressure pocket creates a retarding force and is commonly referred to as pressure drag. An energized or turbulent flow is less likely to become separated from an aerodynamic surface than a non-energized or laminar flow. Thus, one method of reducing pressure drag is to artificially convert or "trip" the laminar fluid flow over the surface to a turbulent flow. The energy within the turbulent boundary layer helps to maintain the flow attached to the surface, thereby reducing or delaying flow separation until a higher angle of attack so that a reduction in the total amount of pressure drag is achieved. However, the tripped turbulent flow will, in turn, contribute to a higher degree of friction drag, as discussed above.

Many prior methods have been used to reduce both friction and pressure drag. With respect to pressure drag, some of these methods include adding structure to the leading edge of an aerodynamic surface. Such structures may include rough strips extending spanwise along the leading edge of the surface or a plurality of vortex generators spaced along the leading edge. These structures extend into the relatively thin laminar boundary layer to disrupt the laminar flow, thereby prematurely tripping the flow to a turbulent state and energizing the boundary layer so that the flow is less likely to separate from the surface. While these and other similar structures may successfully reduce the pressure drag associated with flow separation, they do not address the resultant increase in friction drag caused by the larger proportion of turbulent flow within the boundary layer.

With respect to friction drag, a turbulent boundary layer has a greater velocity gradient than a laminar boundary layer, and the greater velocity gradient, combined with the inherent instability within the turbulent boundary layer, tends to transfer a relatively high amount of momentum from the boundary layer to the aerodynamic surface. Prior means for reducing friction drag have included both passive and active techniques for reducing the instability or the momentum transfer within the turbulent boundary layer. Examples of the passive control means include riblets formed on the aerodynamic surface or large eddy breakup units (LEBUs). With respect to riblets formed in the streamwise direction on the aerodynamic surface, the streamwise grooves formed by the riblets attempt to redirect the streamwise fluid flow within the boundary layer away from the aerodynamic surface, thereby reducing the momentum transfer between the boundary layer and the surface. However, while such passive devices have demonstrated that they are capable of reducing friction drag, the net effects of such devices are lessened due to offsetting drag increases in other areas. For example, while riblets may decrease the effect of friction drag, they also increase the wetted surface area of the aerodynamic surface so that the total amount of friction drag is not dramatically decreased. Additionally, the parameters of the riblets are not easily changed once they are optimized for a particular flight condition. Similarly, LEBUs contribute extra form or device drag to the total drag of the aerodynamic surface. One example of an active form of friction drag control is a suction system in which a pattern of fine holes is formed in the aerodynamic surface. Suction is applied to the holes to create a pressure gradient that suppresses instability growth within the turbulent boundary layer. However, the obvious drawbacks of such a system include its cost, ongoing maintenance and its susceptibility to adverse weather conditions.

Additionally, in a 1992 article entitled "Suppression of Turbulence in Wall-Bounded Flows by High-Frequency Spanwise Oscillations," Jung et al. utilized computational fluid dynamics simulations to determine whether a reduction in turbulence-induced drag could be realized in a simulated bounded channel flow by rapidly oscillating one of the channel walls in a spanwise direction (orthogonal to the direction of the simulated free stream channel flow). The article notes that the turbulent bursting process was suppressed and significant reductions in the calculated turbulent drag force were realized. However, Jung et al. offered no explanation or suggestion of how the spanwise oscillations could be achieved outside the purely computational realm.

A practical technique is needed for reducing the friction effects of turbulent boundary layers while not simultaneously contributing to other types of drag. Additionally, the technique for reducing friction drag would provide further value if it could reduce pressure drag by energizing laminar boundary layers while simultaneously working to reduce momentum transfer within the turbulent boundary layer.

It is with respect to these and other background considerations, limitations and problems, that the technique of the present invention has evolved.

SUMMARY OF THE INVENTION

One of the significant aspects of the present invention pertains to a new method of disrupting a turbulent boundary layer within a fluid flow passing over a surface, for example an aerodynamic surface having defined streamwise and spanwise dimensions. The method of the present invention utilizes bending waves generated on the surface to impose velocity and/or pressure oscillations within the turbulent boundary layer which disrupt the normal turbulent process within the boundary layer. The bending waves preferably decrease the transfer of momentum between the turbulent flow and the surface, thereby decreasing friction drag on the surface caused by the turbulent flow. However, the present invention also pertains to using the bending waves on the surface to enhance the turbulent process and thus increase the momentum transfer between the fluid flow and the surface. In a preferred embodiment, the bending waves extend along the surface in a predominantly spanwise direction, and the disruptive effect on the turbulent boundary layer flow propagates in a streamwise direction downstream of the location of the bending wave on the surface.

Another significant aspect of the present invention relates to utilizing bending waves on a surface to alter the velocity profile of turbulent flow within a boundary layer adjacent the surface. In a preferred embodiment, the bending waves will decrease the velocity gradient of the turbulent flow at a location adjacent the surface to reduce the velocity of the fluid flow adjacent the surface and thereby reduce the amount of momentum transferred from the turbulent boundary layer flow to the surface. However, the present invention also relates to using bending waves to increase the velocity gradient of the turbulent flow adjacent the surface to increase both the velocity and the associated momentum transfer of the turbulent flow adjacent the surface.

A further significant aspect of the present invention pertains to different actuators for generating bending waves on surfaces such as aerodynamic surfaces. In a first preferred embodiment, piezoelectric strips of opposite polarity are placed on either the same or opposing sides of the surface and driven with a time-varying voltage to bend the surface in a predominantly spanwise direction so that the bending waves are generated within the surface itself. In another preferred embodiment, an external actuator is placed atop the surface and bending waves are generated within the external actuator. A preferred embodiment of the external actuator includes a flexible strip bonded to a resilient spacer material which, in turn, is bonded to the surface to allow the flexible strip to move relative to the surface. Segments of the flexible strip may thus be driven relative to the surface to generate a bending wave within the strip. Preferred methods of driving the segments of the strip in relation to the surface include the use of piezoelectric, electrostatic, magnetic or hydraulic forces.

A further significant aspect of the present invention pertains to utilizing bending waves to energize boundary layer flow over a surface, thereby delaying flow separation and reducing resultant pressure drag when the surface is placed at high angles of attack relative to the free stream fluid flow. In a preferred embodiment, bending waves are generated within a laminar portion of a fluid flow boundary layer to prematurely trip the laminar portion of the boundary layer to turbulent flow, while simultaneously disrupting the normal turbulent flow within the boundary layer.

A more complete appreciation of the present invention and its scope may be obtained from the accompanying drawings, which are briefly summarized below, from the following detailed descriptions of presently preferred embodiments of the invention, and from the appended claims.

DETAILED DESCRIPTION OF THE DRAWINGS

FIG. 5 is a graph similar to that shown in FIG. 4 illustrating a variable bending wave.

FIG. 6 is a top view of the flat plate shown in FIG. 1, illustrating a preferred embodiment of a bending wave actuator attached to a top surface of the flat plate.

FIG. 7 is a cross-section view taken substantially in the plane of line 7—7 of FIG. 6.

FIG. 8 is a generalized section view of the flat plate shown in FIG. 1 illustrating an alternative embodiment of a bending wave actuator attached to a bottom surface of the flat plate.

FIG. 9 is a top view of an aircraft wing with structural ribs and a bending wave actuator similar to the actuator illustrated in FIG. 8 shown in phantom.

DETAILED DESCRIPTION OF THE PREFERRED EMBODIMENT

Figure 1:
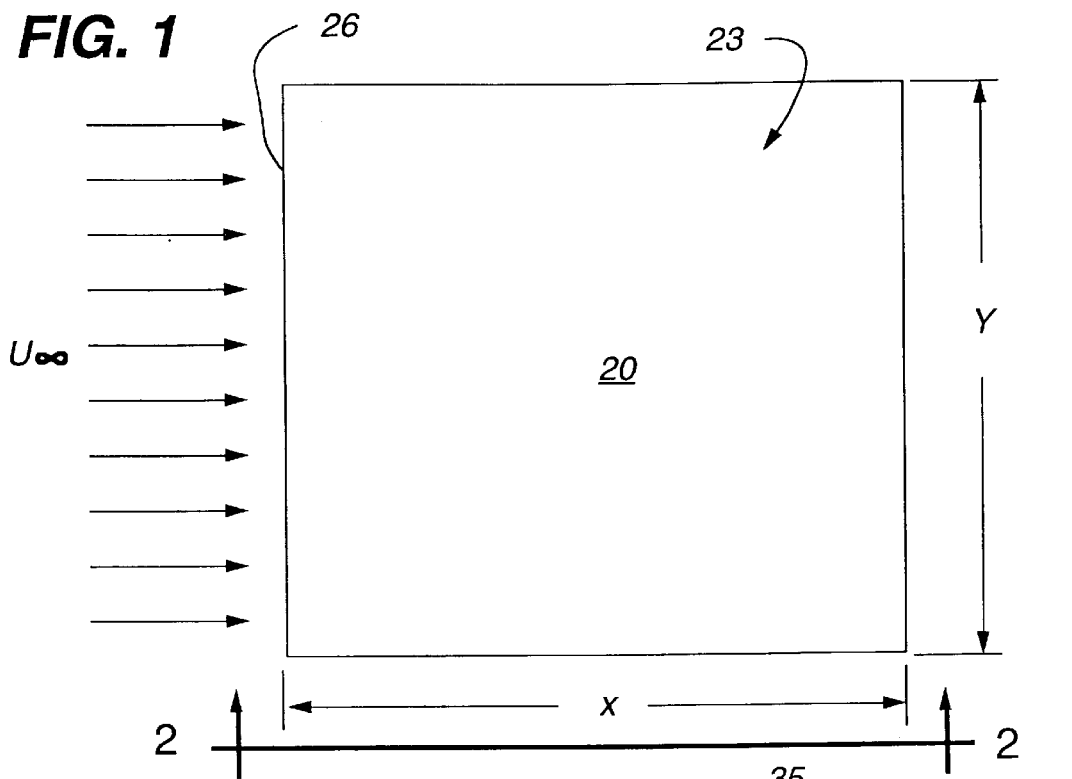
FIG. 1 is a top view of a typical flat plate subjected to a free stream fluid flow.

FIG. 1 illustrates a section of an aerodynamic flat plate 20 having a top surface or "wall" 23 and a leading edge 26 presented to a free stream fluid having a velocity noted as $U_\infty$. The leading edge 26 extends in a spanwise direction noted as the "y" dimension in FIG. 1, while the free stream velocity defines a streamwise dimension noted as the "x" dimension in FIG. 1. Although this detailed description will typically refer to the flat plate 20 or other aerodynamic surfaces, it should be noted that the present invention is not limited to aircraft or aerodynamic applications, but may be applied to any fluid flow and any surface within the fluid flow which is susceptible to either friction or pressure drag effects.

Figure 2:
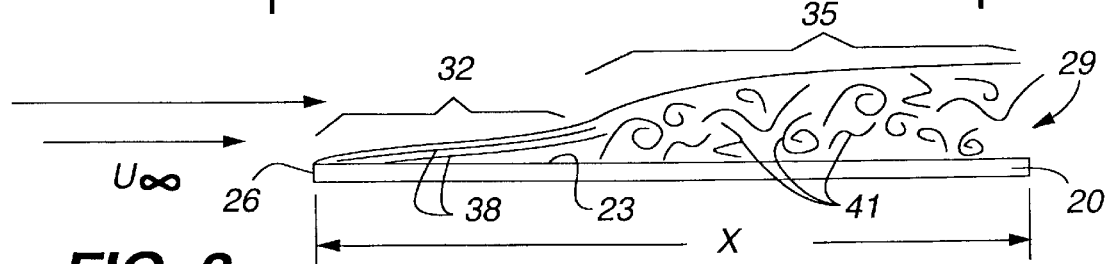
FIG. 2 is a right side elevational view of the flat plate shown in FIG. 1, illustrating a typical boundary layer extending between the flat plate and the free stream fluid flow.

FIG. 2 shows a side-edge view of the flat plate 20 and illustrates the general structure of a typical boundary layer 29 which forms as the free stream fluid passes over the top surface or wall 23 of the flat plate. The boundary layer 29 in FIG. 2 contains two separately defined flow regions extending in a streamwise direction: a laminar region 32 extending from the leading edge 26 of the flat plate 20; and a turbulent region 35 extending downstream of the laminar region 32. The transition between the laminar and turbulent regions of the boundary layer typically occurs within a relatively small "transition region." However, the details of the transition region are not significant with respect to the present invention, and thus the transition region is not separately delineated within the drawings.

Figure 18:
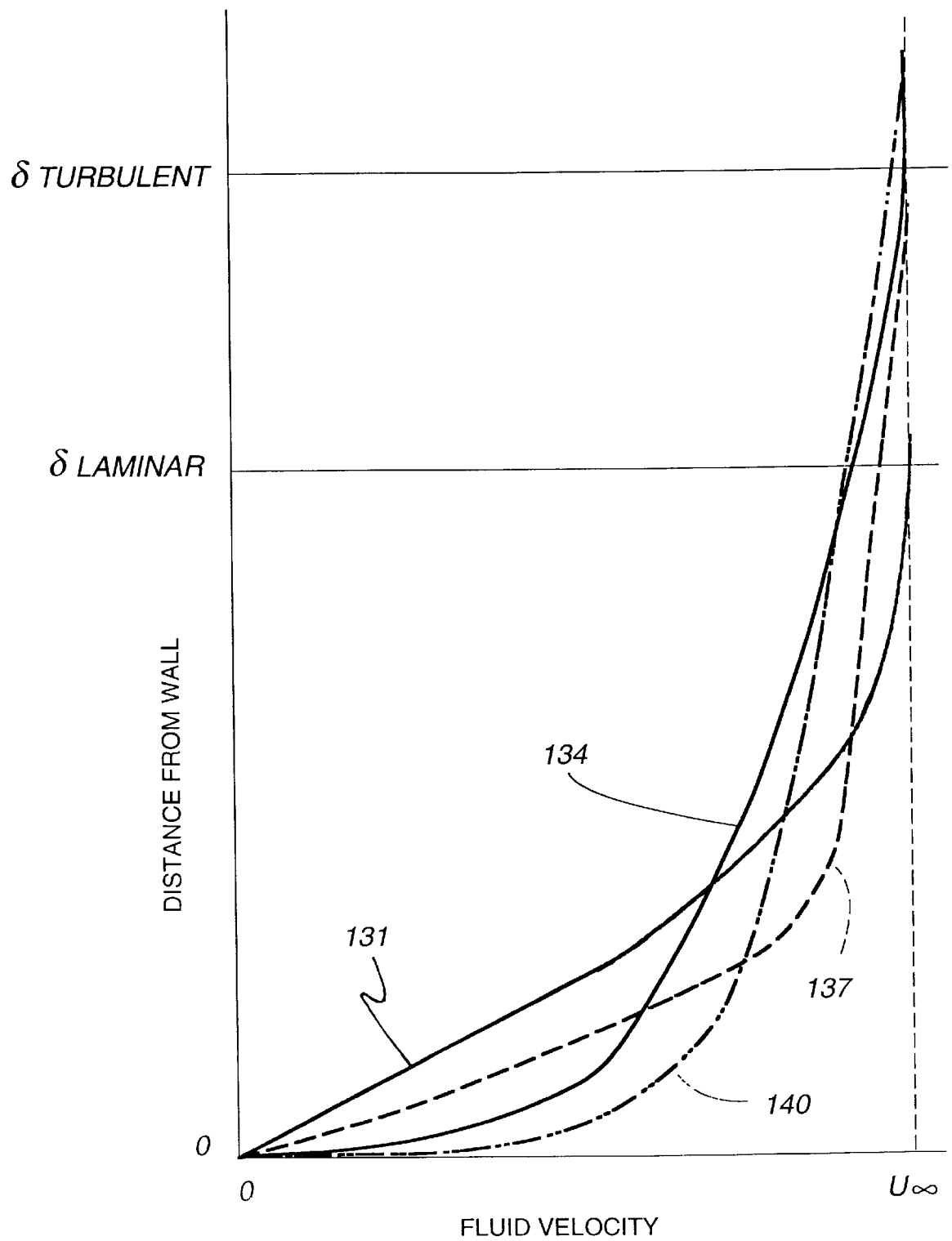
FIG. 18 is a graph illustrating velocity profiles for a laminar boundary layer, an unactuated turbulent boundary layer and two turbulent boundary layers which have been acted upon by bending waves of the present invention.

A velocity gradient exists within the boundary layer 29 which ranges from zero at the wall 23 of the flat plate 20 to the free stream velocity $U_{28}$ on the opposite side of the boundary layer. Examples of typical laminar and turbulent boundary layer velocity profiles are shown in FIG. 18 (denoted by reference numbers 131 and 134, respectively). Within the laminar region 32, the flow streamlines 38 are substantially directed in the streamwise direction so that substantially all the momentum transfer between the flow and the flat plate results from the effects of fluid viscosity (i.e., viscous shear forces). However, as the boundary layer 29 transitions from laminar to turbulent flow, eddies and vortices 41 are formed within the boundary layer as shown in FIG. 2. These eddies and vortices 41 within the turbulent region 35 not only increase the size of the boundary layer 29, they also add to the momentum transfer mechanism by allowing convection of high speed flow from outer regions of the boundary layer to the wall 23 of the flat plate (i.e., turbulent shear force). The proximity of these eddies and vortices 41 near the wall 23, and the resultant transfer of momentum to the wall 23, results in a significant increase in skin friction for the portion of the flat plate 20 underlying the turbulent region 35 in relation to the portion of the flat plate 20 underlying the laminar region 32. Thus, the turbulent region 35 of the boundary layer has a greater velocity gradient near the wall 23 than the laminar region 32 (FIG. 18), and this greater proportion of high speed flow near the wall 23 accounts for the increase in skin friction of the turbulent region 35 relative to the laminar region 32. Further explanations of the mechanisms at work within a turbulent flow are not necessary for a thorough description of the present invention and, in any event, are readily known to those having skill in the art of fluid dynamics.

The present invention pertains to a method of interfering with or disrupting the usual turbulent flow within the turbulent region 35 of the boundary layer 29, leading to a reduction of the magnitude of the velocity near the wall 23, as well as a decrease in the velocity gradient near the wall (FIG. 18), to thereby reduce the amount of momentum transferred from the turbulent flow to the wall of the flat plate 20. The reduction in momentum transfer, in turn, reduces the skin friction drag force associated with turbulent flow.

Figure 10:
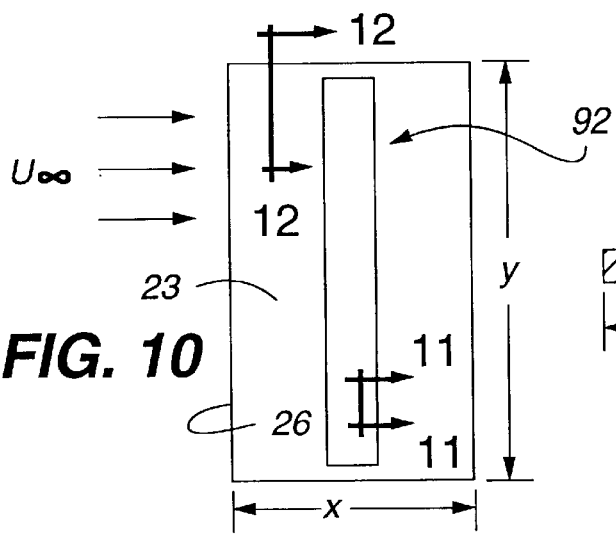
FIG. 10 is a top view of the flat plate shown in FIG. 6 illustrating an alternative embodiment of a bending wave actuator.

The present invention utilizes bending waves 44 which preferably propagate in a spanwise direction either through the flat plate 20 (FIG. 3) or along a separate surface attached to the wall 23 of the flat plate 20 (FIG. 10). The present invention utilizes unique bending wave actuators to generate the spanwise bending waves in a manner that does not otherwise interfere with the usual flow over the flat plate or substantially contribute to other types of aerodynamic drag. Experiments with the bending wave actuators have shown actual reductions in friction drag, evidenced by measured decreases in near-wall velocity and velocity gradients, as a result of the interaction between the bending wave 44 and the turbulent flow within the boundary layer. Thus, the bending waves of the present invention can affect the evolution of turbulent flow in the boundary layer 29 and reduce the amount of momentum transferred to the wall 23.

Figure 3:
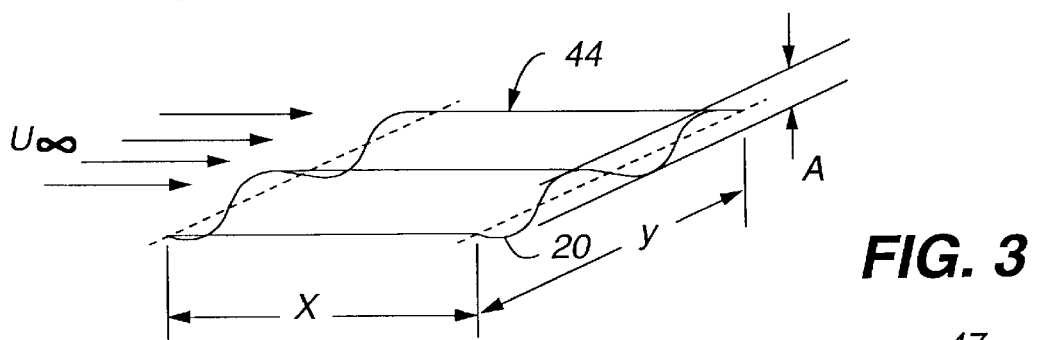
FIG. 3 is a perspective view of the flat plate shown in FIG. 1 illustrated in a preferred actuated state by a spanwise bending wave of the present invention.
Figure 4:
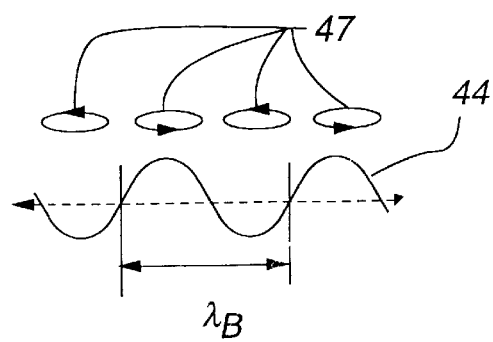
FIG. 4 is a graph of the spanwise bending wave shown in FIG. 3, illustrating oscillations created by the bending wave in an adjacent fluid.

FIGS. 3 and 4 illustrate a spanwise bending wave 44, as described above, having an amplitude denoted as A in FIG. 3 and having a wavevector (i.e., a direction perpendicular to the crests and troughs of the wave) extending along the y-axis. While the preferred embodiment of the present invention is illustrated with bending waves which extend along the y-axis and are thus perpendicular to the streamwise direction of the fluid flow, the present invention encompasses the use of bending waves which extend in a substantially or predominantly spanwise direction so that the bending wavevector forms an angle of greater than 45 degrees with respect to the streamwise direction.

It is well known that structural vibrations generate vibrations of the same frequency in an adjacent fluid. It is further known that when, for a given frequency, the wavelength of the structural vibration is shorter than the corresponding acoustic wavelength for the adjacent fluid, the vibration will not radiate a far-field acoustic signal, but will rather create a near-field pressure oscillation 47 in the fluid as shown in FIG. 4. With respect to the bending wave 44 shown in FIGS. 3 and 4, the resultant near-field velocity and pressure oscillations 47 will be substantially contained in a plane which is parallel to the plane of the wall 23. Thus, for a given bending frequency $f_B$, the bending wave 44 will generate the near-field velocity and pressure oscillations shown in FIG. 4 when the wavelength $\lambda_B$ is smaller than the corresponding acoustic wavelength in the adjacent fluid. Alternatively, given the inverse relationship of wavelength $\lambda$ and wavenumber k (where $\lambda=2\pi/k$), the bending wave 44 will create near-field velocity and pressure oscillations when the bending wavenumber $k_B$ is greater than the corresponding acoustic wavenumber for the given frequency $f_B$.

FIG. 5 illustrates a variable bending wave 50 in which the bending wave frequency $f_B$ has been decoupled from the bending wavenumber $k_B$ so that the wavenumber $k_B$ may be chosen independently of the frequency $f_B$. Thus, for the spanwise bending wave 50 of frequency $f_B$ shown in FIG. 5, the wavenumber $k_B$ varies in the spanwise direction (resulting in variable wavelengths $\lambda_1$ and $\lambda_2$). The ability to decouple bending wave frequency $f_B$ from bending wavenumber $k_B$ as shown in FIG. 5 depends on the type of bending wave actuator used and, to a certain extent, on the material through which the bending wave propagates. Different types of bending wave actuators and different methods of achieving a bending wave along the span of an aerodynamic surface will be discussed below.

FIGS. 6 and 7 illustrate a double-sided or bimorph bending wave actuator 53 comprising opposing piezoelectric patches 56 and 59 bonded to opposite sides of the flat plate 20. For example, the piezoelectric patch 56 is bonded in a known manner to the top surface or wall 23 of the flat plate 20 (FIG. 6) near a free end of the flat plate. Similarly, the second piezoelectric patch 59 is bonded in a known manner to a bottom surface 62 of the flat plate 20, as shown in FIG. 7. The size, thickness and material of the piezoelectric patches 56 and 59 may vary depending on the particular surface which is to be actuated. However, in experiments conducted with aluminum flat plates having thicknesses in the range of 0.004 to 0.032 inches, the preferred piezoelectric patches were lead-zirconium-titanate (PZT) patches having a thickness of 0.010 inches. The operation and function of such patches are well known to those having skill in the art of piezoelectric materials and a detailed explanation of this particular actuator is not necessary to a full understanding of the present invention.

The polarity of the surfaces of the piezoelectric patches 56 and 59 bonded to the wall 23 and the bottom surface 62, respectively, of the flat plate 20 are reversed relative to one another so that a voltage applied across the bonded piezoelectric patches 56 and 59 causes one patch (patch 56 in FIG. 7) to contract while the other patch (patch 59 in FIG. 7) expands. Since the patches 56 and 59 are bonded to the flat plate 20, the net effect of the contraction/expansion forces is to couple opposite shear loadings on opposite sides of the flat plate, as shown in FIG. 7. The opposing shear forces behave like concentrated moments at the edges of the patches 56 and 59 and tend to bend the end of the flat plate 20. Application of a time-varying voltage from an external source (not shown) causes the patches to alternately (and oppositely) attempt to contract and expand at a constant frequency. The cyclical moment applied by the patches 56 and 59 tends to bend the end of the flat plate 20 at the constant frequency. This bending motion creates the spanwise bending wave 44 which is transmitted along the flat plate 20 as shown in FIG. 3. When the frequency of the actuator 53 matches or approximates a natural or harmonic frequency of the flat plate 20, a standing wave of frequency $f_B$ may be established. At other actuator frequencies, a traveling wave or a random wave action may be established along the flat plate 20. The variable bending wave 50 shown in FIG. 5 could be achieved through the use of a spanwise array of bimorph piezoelectric patches (not shown), however, the impedance characteristics of the flat plate (i.e., its tendency to favor its natural harmonic frequencies) would tend to interfere with the creation of a standing variable-wavelength bending wave.

FIG. 8 is a cross-section similar to FIG. 7 illustrating a single-sided or monomorph bending wave actuator 65 utilizing at least one piezoelectric patch 68 bonded to the bottom surface 62 of the plate 20. The monomorph actuator 65 operates in a similar manner to the above-described bimorph actuator 53, but does not rely on opposing patches to create the bending moment. Rather, a time-varying voltage signal applied to the single piezoelectric patch 68 will cause the patch to alternately attempt to expand and contract to create a moment at the edge of the flat plate 20 which tends to bend the end of the plate. However, due to the lack of an opposing patch as in the bimorph actuator 53, the monomorph actuator 65 tends to simultaneously create in-plane expansion and contraction forces as opposed to the relatively pure bending moment created by the bimorph actuator 53. Thus, a second piezoelectric patch 71 may optionally be placed adjacent to the first patch 68 on the bottom surface 62 of the plate 20, as shown in FIG. 8. The second patch 71 is typically oriented so that its polarity is opposite that of the first patch 68 to attempt to counter the local in-plane expansion and contraction of the first patch 68, and thereby neutralize the extensional strains on the entire flat plate 20. Likewise, additional patches (not shown) could be added to allow for a distributed actuation of the flat plate 20. Such a distributed array of patches would enable the actuator to substantially overcome the natural impedance of the plate and thus drive the plate at a variable wavelength, as shown in FIG. 5.

The monomorph actuator 65 has several advantages over the bimorph actuator 53, chief among them being that piezoelectric patches need not be placed on both sides of an aerodynamic surface. Rather, the piezoelectric patch or patches may be placed entirely below the skin of an aerodynamic surface so that no parts of the actuator 65 are exposed to the fluid flow over the wall 23 of the surface. This is a significant benefit given the nature of the flow for many aerodynamic or other types of fluid flow applications. For example, FIG. 9 illustrates a section of an aircraft wing 74 having a top surface 77, a leading edge 80, and a trailing edge 83. Parallel reinforcing ribs 86 (shown in phantom in FIG. 9) extend in a streamwise direction and define a panel 89 anchored on opposite sides by the ribs 86. A single monomorph actuator 65 (also shown in phantom) may be attached to the underside of the panel 89 to create a bending wave 44 through the panel between the ribs 86. However, many aerodynamic surfaces may be too rigid and unyielding to be bent by the monomorph actuator 65. Similarly, there may be a number of aerodynamic surfaces which are either too thick to be bent by the bimorph actuator 53 or for which access to both sides of the surface is not readily available. Alternatively, the surfaces may be too convoluted and thus vary too greatly from the theoretical flat plate to effectively bend the surfaces in a spanwise manner to reduce friction drag as described above. In these instances, an alternative type of actuator must be used to transmit spanwise bending waves through the boundary layer 29 along the wall 23 of the aerodynamic surface without bending the actual surface.

Figure 12:
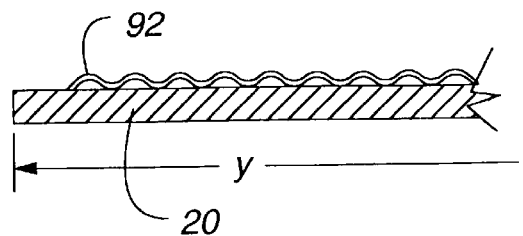
FIG. 12 is a cross-section view taken substantially in the plane of line 12—12 of FIG. 10, illustrating the bending wave actuator shown in FIG. 10 in an actuated state relative to the flat plate.
Figure 11:
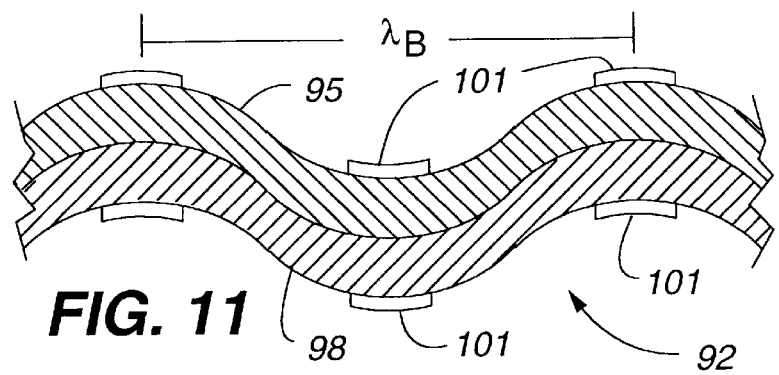
FIG. 11 is a cross-section view taken substantially in the plane of line 11—11 of FIG. 10, illustrating in an actuated state the piezoelectric materials which form the bending wave actuator shown in FIG. 10.

FIG. 10 illustrates an external bending wave actuator 92 comprising a spanwise piezoelectric polymer strip that does not actually bend the top surface or wall 23 of the flat plate 20. As shown in FIG. 11, the external actuator 92 is preferably formed from two sheets of polyvinylidenefluoride ("PVF") film 95 and 98 which are bonded together in a known manner so that the polarity of the sheets 95 and 98 are 180 degrees out of phase. The construction and use of PVF sheets are well known to those having skill in the art of piezoelectric materials and a detailed explanation of this particular material is not necessary to a full understanding of the present invention. Application of a time-varying voltage to electrodes 101 on the opposing sheets of the PVF film causes the external piezoelectric actuator 92 to bend as shown in FIGS. 11 and 12. The pattern and spacing of the electrodes 101 on the PVF film sheets 95 and 98 may be correlated to a desired wavelength $\lambda_B$ of the desired bending waves, as shown in FIG. 11. In this manner, the bending wave wavelength $\lambda_B$ may be independently and directly controlled and thereby decoupled from the bending wave frequency $f_B$.

Figure 13:
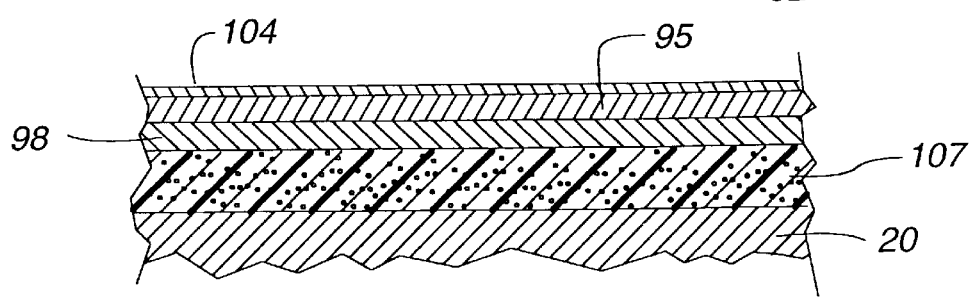
FIGS. 13 and 14 are enlarged section views of the bending wave actuator shown in FIG. 12, illustrating alternative embodiments of a compliant spacer material attaching the bending wave actuator to the flat plate.
Figure 14:
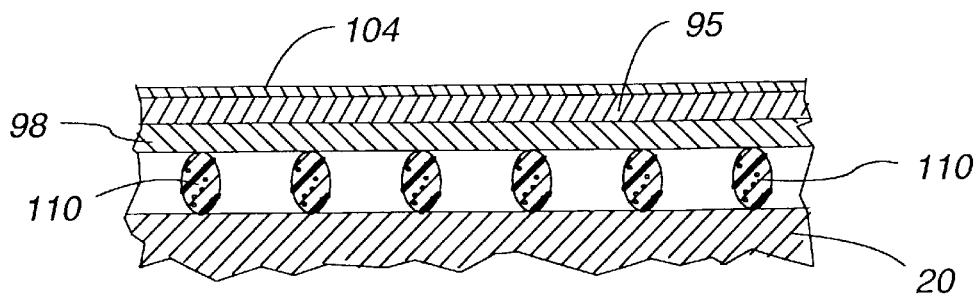

A thin protective layer 104 (FIGS. 13 and 14) of flexible yet resilient material, such as aluminum, may be placed atop the upper sheet 95 to protect the external actuator 92 from damage during operation within harsh conditions such as those that a typical aircraft might encounter. Since the external actuator 92 must move relative to the wall 23 of the flat plate 20, the sheets 95 and 98 can not be bonded to the wall of the flat plate 20 in the manner of the above-described bimorph and monomorph actuators 53 and 65. Thus, in one preferred embodiment, the external actuator 92 is bonded to a compliant layer 107 (FIG. 13) which, in turn, is bonded to the wall of the flat plate 20. The compliant layer 107 may comprise a foam elastomer which will maintain its compliant nature throughout a range of environmental conditions such as those that a typical aircraft might encounter. The compliant layer 107 thus allows for displacement of the sheets 95 and 98 relative to the wall 23. In yet another preferred embodiment, as shown in FIG. 14, a plurality of compliant spacer elements 110 may be arrayed in the spanwise direction to simultaneously support the external actuator 92 and reinforce the bending effect of the sheets 95 and 98. The spacer elements 110 may be randomly spaced to account for varying actuator bending wave frequencies $f_B$ and bending wave numbers $k_B$. Alternatively, the compliant spacers 110 could be placed at the nodes of a preferred standing bending wave 44 (having a preferred bending wavelength $\lambda_B$) to ensure that the antinodes of the bending wave are not obstructed by either the spacers 110 or the wall 23 of the flat plate 20, thereby enhancing the amplitude of the bending wave 44. As discussed above with respect to the compliant layer 107 shown in FIG. 13, the compliant spacers 110 are also preferably formed from a foam elastomer which will maintain its compliant nature even in adverse conditions, although the present invention encompasses the use of any compliant material and is not limited to the use of foam elastomers.

The overall width (i.e., the distance above the wall of the flat plate 20) of the external actuator 92 (FIG. 11), the protective layer 104 and the compliant layer 107 (FIG. 13) or the compliant spacers 110 (FIG. 14) is on the order of 0.050 inches to minimize any interference with the usual flow over the flat plate 20 when the external actuator 92 is not in use. Additionally, the leading and trailing edges (FIG. 10) of the external actuator 92 may be contoured or tapered (not shown) to further reduce any potential for interference between the non-activated actuator 92 and the flow over the flat plate 20. Furthermore, the amplitude of the bending waves generated by the external actuator 92 are not so great as to extend beyond the boundary layer 29. Indeed, the amplitude of the bending wave 44 varies with the frequency $f_B$ and is selected to ensure that the near-field velocity and pressure oscillations 47 (FIG. 4) are sufficient to interfere with the turbulent boundary layer structures, as discussed above. For example, it is believed that the velocity of the out-of-plane displacement of the external actuator 92 should be on the order of 1/10th of the free stream velocity $U_{28}$, and is preferably no less than 1/100th of $U_{28}$. Thus, choosing as an example a free stream velocity $U_{28}$=12.0 m/s (approximately 39.4 f/s) and choosing an out-of-plane displacement velocity of 1/10th the free stream velocity $U_{28}$, and further considering that the bending wave amplitude is equal to the out-of-plane displacement velocity divided by the factor $2\pi f$, where f is the frequency of the actuator, then for a sample value of f=800 Hz the bending wave amplitude can be calculated to be approximately 0.009 inches. Thus, bending wave amplitudes of such magnitude, even when combined with the overall width of the actuator 92 and its compliant layer as discussed above, will not extend beyond the boundary layer 29 which will typically have a width on the order of one inch (and usually ranging from between 0.5 to 1.5 inches during experimental tests).

Figure 15:
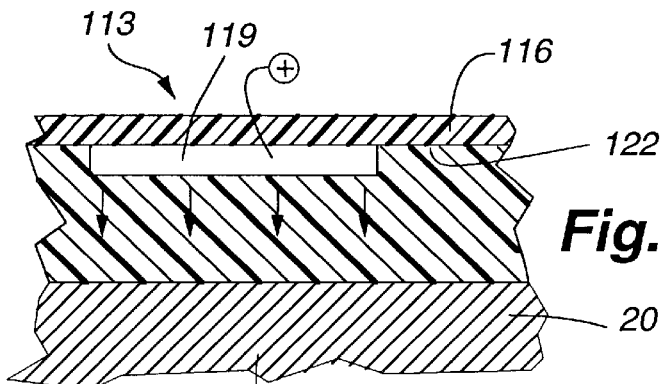
FIG. 15 is an enlarged section view similar to FIG. 13, illustrating an alternative embodiment of a bending wave actuator utilizing electrostatic forces.
Figure 16:
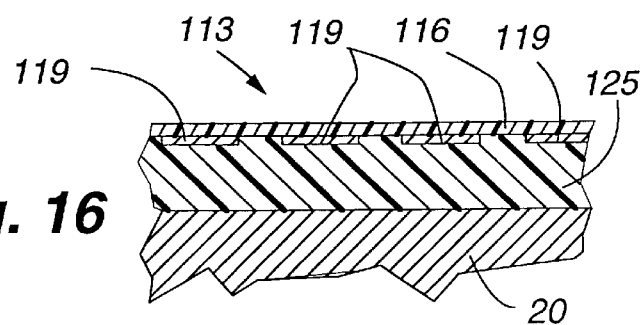
FIGS. 16 and 17 are section views of the electrostatic bending wave actuator shown in FIG. 15, illustrating alternative embodiments of a compliant spacer material attaching the bending wave actuator to the flat plate.
Figure 17:
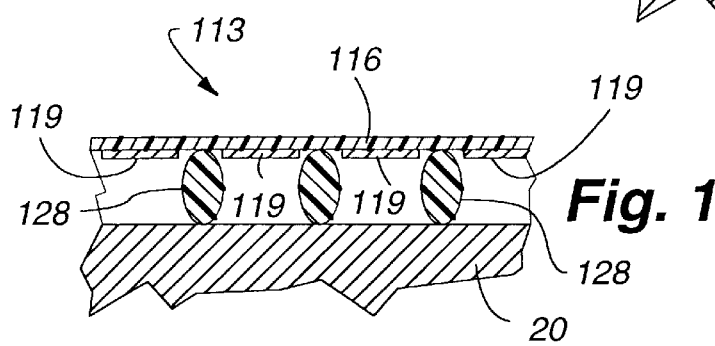

An alternative embodiment of a spanwise bending wave actuator 113 is shown in FIGS. 15–17. The actuator 113 is similar in external appearance to the piezoelectric actuator 92 shown in FIG. 12, but utilizes electrostatic rather than piezoelectric forces and preferably comprises a strong yet resilient plastic strip 116 (FIG. 15) having an array of electrodes 119 bonded to a lower surface 122 of the strip 116. A time-varying voltage may be applied to the electrodes 119 so that the electrodes are alternately attracted to and repulsed from a charged surface, such as the wall of the flat plate 20 or the metal surface of an aircraft wing. As described above with regard to the piezoelectric actuator 92, the plastic strip 116 may be bonded to a compliant layer 125, as shown in FIGS. 15 and 16, or may be supported above the wall 23 by compliant spacers 128, as shown in FIG. 17. In either case, the compliant material is preferably formed of an appropriate elastomeric material which will maintain its compliant nature over a variety of adverse environmental conditions. The plastic strip 116 serves to protect the electrodes 119 and the compliant material in much the same manner that the additional layer 104 (FIGS. 13 and 14) protects the piezoelectric sheets 95 and 98. Additionally, as with the electrodes 101 within the PVF sheets 95 and 98 of the piezoelectric actuator 92 (FIG. 11), the pattern and spacing of the electrodes 119 bonded to the strip 116 may be correlated to a desired wavelength $\lambda_B$ of the desired bending wave 44 to directly control the shape of the bending wave within the actuator 113 and thereby decouple the bending wave frequency $f_B$ from the bending wavelength $\lambda_B$ or the bending wavenumber $k_B$.

Examples of other actuator mechanisms that could replace the electrostatic electrodes of FIGS. 15–17 include electromagnetic actuators (not shown) employing small coils to create a magnetic field,. The magnetic lines of force (not shown) would then take the place of the electrostatic lines of force created by the charged dipoles of FIG. 15. Likewise, small hydraulic or other fluidic actuators (not shown) could take the place of the electrostatic electrodes of FIGS. 15–17 to provide the required actuation of the strip 116 relative to the plate 20.

Regardless of whether bending wave actuators are used to bend the flat plate 20 itself or a separate structure extending in a spanwise direction along the top surface or wall 23 of the flat plate 20, the bending waves will tend to interfere with the usual turbulent process within the turbulent region 35 of the boundary layer 29 (FIG. 2). The near-field velocity and pressure oscillations 47 created by the bending wave 44 (FIG. 4) tend to interact with the turbulent flow region 35 in a manner which interrupts the typical evolution of turbulence and, in a preferred embodiment, reduces the momentum transfer from the turbulent flow to the wall 23 of the flat plate. However, in another embodiment, the bending waves may enhance the turbulent flow and increase the momentum transfer (and thus the friction drag) within the boundary layer.

FIG. 18 illustrates typical velocity profiles 131 and 134 for laminar and turbulent regions, respectively, of a non-actuated boundary layer. The x-axis of the plot in FIG. 18 represents the fluid velocity over the wall of the flat plate, while the y-axis represents the distance from the wall. Thus, the profiles 131 and 134 each terminate at a velocity equal to the free stream velocity $U_{28}$. As noted in FIG. 2, the width of the laminar region 32 (i.e., the distance from the wall when the velocity within the laminar region is equal to $U_{28}$) is less than the width of the turbulent region 35. This difference in boundary layer widths is graphically illustrated within FIG. 18 by the representations $\delta_{TURBULENT}$ and $\delta_{LAMINAR}$ on the y-axis. The velocity profiles 131 and 134 within FIG. 18 further illustrate that the velocity gradient within the turbulent region 35 is greater near the wall 23 of the flat plate 20 than the velocity gradient of the laminar region 32. As discussed above, this greater velocity gradient near the wall 23 for the turbulent region 35 results in a greater amount of high speed flow adjacent the wall which, in turn, results in a greater amount of momentum transfer (and thus friction drag) within the turbulent region as opposed to the laminar region 32. The present invention utilizes bending waves to alter the typical turbulent flow and thus change the velocity profile for the turbulent region 35. The dashed line 137 represents the velocity profile of the turbulent region after it is acted upon by a drag-reducing bending wave. As shown in FIG. 18, the velocity profile 137 has a reduced velocity gradient relative to the unactuated turbulent profile 134 near the wall of the flat plate so that the magnitude of the fluid velocity is reduced near the wall. The reduced flow velocity near the wall transfers less momentum to the wall and thus reduces the amount of friction drag associated with the turbulent region 35 of the boundary layer. Alternatively, the broken line 140 represents the velocity profile for the turbulent region 35 which has been acted upon by a drag-increasing bending wave. The velocity profile 140 has an increased velocity gradient relative to the unactuated profile 134 near the wall with a resultant increase in the velocity of the fluid flow near the wall. The higher velocity near the wall tends to increase both the momentum transfer to the wall and thus the friction drag within the turbulent region 35 (FIG. 2).

Experimental results have shown that the effectiveness of bending waves on reducing friction drag depends on the Reynold's number of the free stream flow, the angle of attack of the flow to the flat plate 20, the bending wave frequency $f_B$, and the amplitude of the bending wave 44, among other factors. Indeed, for certain values of the bending wave frequency $f_B$, it may be possible to obtain an increase in friction drag should the near-field velocity and pressure oscillations 47 from the bending wave reinforce the turbulent flow structure and increase the momentum transfer to the flat plate 20. However, experimental results have shown that when the bending wave comprises a standing wave, the near-field velocity and pressure oscillations will decrease momentum transfer and thus friction drag within a turbulent flow. Alternatively, experimental results have shown that friction drag increases are most likely when the bending wave frequency $f_B$ is not sufficiently close to a natural harmonic of the flat plate 20 so that no standing wave results. However, traveling waves of certain frequencies may also produce friction drag decreases within the turbulent flow. Of course, the present invention is not limited to the use of standing waves to reduce friction drag. Rather, it encompasses any use of spanwise bending waves which interferes with the usual turbulent process within a fluid flow. Furthermore, while the primary purpose of the present invention is to reduce friction drag, it may be desirable in some instances to utilize spanwise bending waves to increase the turbulent effect within a boundary layer such as when enhanced turbulent mixing is desired.

The experimental results referenced above were obtained using a piezoelectric bimorph actuator on an aluminum flat plate at zero angle of attack (similar to that shown in FIGS. 6 and 7). These results indicated significant drag reductions (up to 11%) for different values of $f_B$ (e.g., 78 Hz, 446 Hz and 748 Hz) for flows having a Reynold's number of approximately 400,000. These particular bending wave frequencies are not believed to be applicable to other types of aerodynamic surfaces or other bending wave actuators, and should not be construed as a limitation upon the present invention.

The bending wave actuators shown in FIGS. 6–17 need not provide full coverage of the streamwise or x dimension of the flat plate 20. Indeed, regardless of whether the flat plate 20 itself transmits the spanwise bending wave (as with the bimorph and monomorph bending wave actuators 53 and 65, respectively), or whether a separate actuator is utilized to transmit a spanwise bending wave atop the wall 23 of the flat plate 20 (as with the bending wave actuators shown in FIGS. 10–17), the spanwise bending wave effect will propagate in the streamwise direction downstream of the actuator before the effect decays and the typical turbulent flow region 35 reestablishes itself in the boundary layer 29. Additionally, with respect to the bimorph and monomorph actuators 53 and 65 which actually bend the plate surface, the spanwise bending wave 44 itself will propagate within the plate 20 in a streamwise direction, both upstream and downstream, until the impedance of the flat plate damps out the bending wave. Furthermore, once the bending wave 44 itself damps out, the momentum-reducing bending wave effect will continue to propagate downstream until it too decays past the point where it can effectively interrupt the usual turbulent process within the boundary layer 29. Therefore, the bimorph or monomorph actuators 53 and 65 are preferably positioned along the streamwise or x-axis at a point slightly upstream of the midpoint of the turbulent region over which a drag reduction effect is desired (as shown with the monomorph actuator 65 in FIG. 9). Alternatively, the external piezoelectric and electrostatic actuators 92 and 113, respectively, do not bend the plate surface and thus can not propagate any bending wave effect upstream of their position. Therefore, these actuators are preferably positioned at the leading edge of the turbulent region for which a drag-reducing effect is desired. Furthermore, due to the potential decay of the effectiveness of the near-field velocity and pressure oscillations 47, a streamwise array of these external actuator strips (not shown) may be required to reduce skin friction over the streamwise length of the flat plate 20. When such an array of actuators are utilized, they are preferably spaced in the streamwise direction so that as the effect from one actuator decays below an effective level, the effect from the following downstream actuator restores the overall drag-reducing effect. Alternatively, a single large actuator strip could be utilized to cover the entire turbulent region 35 of the flat plate 20. However, if only a single external actuator strip is used, it is preferably placed at a point just downstream of the transition region (from laminar to turbulent flow) to attempt to influence the largest possible region of turbulent flow within the boundary layer and thereby achieve the greatest reduction of friction drag.

Figure 19:
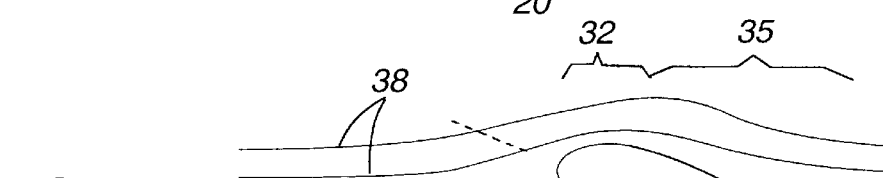
FIG. 19 is a right side elevational view of a typical airfoil at a high angle of attack relative to a free stream fluid flow.
Figure 20:
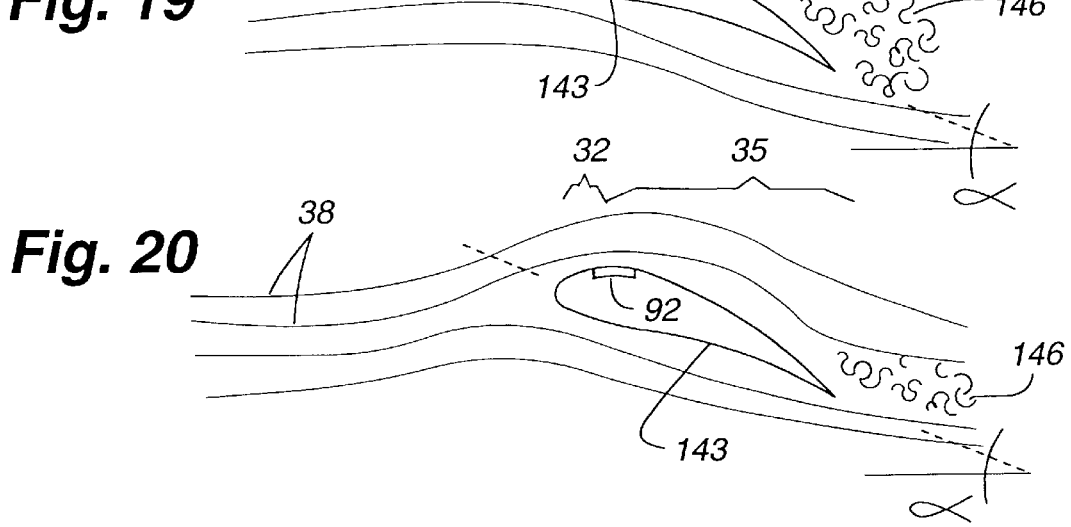
FIG. 20 is a right side elevational view similar to FIG. 19, illustrating the effect of a bending wave actuator of the present invention on an area of separated fluid flow behind the airfoil.

In addition to reducing friction drag through the above-described interactions with the turbulent region 35 (FIG. 2) of a typical boundary layer 29, the present invention may be beneficially used to reduce pressure drag over a flat plate or other aerodynamic surface which encounters a flow at a high angle of attack $\alpha$ (FIGS. 19 and 20). FIG. 19 illustrates a typical problem encountered with high angles of attack where the boundary layer of the flow over an airfoil 143 or other aerodynamic surface does not have sufficient energy to maintain the flow attached to the airfoil 143. This condition results in the flow becoming detached from the airfoil 143, as shown in FIG. 19, thereby creating a low pressure or stagnant region 146 behind the airfoil which increases the pressure drag force on the airfoil. It is known that transitioning the boundary layer from laminar to turbulent increases the energy within the boundary layer and helps to prevent flow separation. Thus, a further preferred embodiment of the present invention, shown in FIG. 20, positions a bending wave actuator (such as the external piezoelectric actuator 92) upstream of the normal transition point between the laminar and turbulent boundary layer regions 32 and 35 to prematurely trip the boundary layer 29 from its initial laminar state to a turbulent state, thereby enlarging the turbulent region 35 of the boundary layer. The enlarged turbulent region 35 (FIG. 20) increases the energy of the boundary layer, thereby delaying or preventing flow separation to a point downstream of the original (unactuated) separation point (FIG. 19). While prior art devices have been used to energize boundary layers and delay flow separation, these devices have typically included structures such as rough strips placed adjacent the leading edge of an aerodynamic surface to trip the boundary layer from laminar to turbulent. However, such prior devices have not attempted to address the countervailing increase in friction drag that usually results from the increased region of turbulent flow. Thus, in the embodiment shown in FIG. 20, the bending wave actuator not only reduces pressure drag by delaying flow separation but, due to the ability of the spanwise bending wave effect to propagate downstream, the bending wave actuator simultaneously reduces the friction drag force caused by the turbulent flow over the top of the airfoil 143.

Thus, the present invention preferably utilizes spanwise bending waves on a surface within a fluid flow to reduce the transfer of momentum (and thus friction drag) between the surface and a turbulent region of a boundary layer between the fluid flow and the surface. However, by disrupting the normal turbulent process within the boundary layer, the bending waves can increase as well as decrease the momentum transfer between the boundary layer and the surface by altering the velocity gradient of the fluid flow within the turbulent region of the boundary layer. Therefore, the bending waves of the present invention are not limited solely to drag-reduction effects, but may also be used to enhance turbulent mixing operations. Furthermore, the benefits of the present invention may be applied to any surface exposed to a fluid flow and should not be construed as limited to aerodynamic applications or to the use of the described actuators.

A presently preferred embodiment of the present invention has been described above with a degree of specificity. It should be understood, however, that this degree of specificity is directed toward the preferred embodiment. The invention itself is defined by the scope of the appended claims.

The invention claimed is:

1. A method of modifying momentum transfer between a fluid flow and a surface over which the fluid flow passes in a streamwise direction by steps comprising disrupting a turbulent region of a boundary layer of the fluid flow passing over the surface, and maintaining the disruption of the turbulent region in a spacially-continuous pattern over an entire substantial spanwise dimension of the surface, the substantial spanwise dimension extending at an angle of greater than 45 degrees with respect to the streamwise direction, said method further comprising:

positioning a bending wave actuator relative to the surface to interact with the boundary layer of the streamwise passing fluid over substantially the entire spanwise dimension of the surface;

energizing the actuator in a predetermined controlled manner to generate and maintain a predetermined spacially-continuous waveform of bending wave oscillations of predetermined wavelengths and amplitudes in the boundary layer over substantially the entire substantial spanwise dimension; and imposing and maintaining oscillations in the streamwise passing boundary layer over substantially the entire substantial spanwise dimension of the surface in the spacially-continuous pattern by transferring energy from the spacially-continuous waveform of bending wave oscillations generated by energizing the actuator, the imposed oscillations in the boundary layer being sufficient to modify the momentum transfer from the turbulent region to the surface.

2. A method as defined in claim 1 wherein:

the turbulent region of the boundary layer imparts a frictional drag force on the surface in the streamwise direction; and the oscillations imposed and maintained in the boundary layer modify the momentum transfer to decrease the streamwise frictional drag force from the turbulent region.

3. A method as defined in claim 2 wherein:

the predetermined waveform of bending wave oscillations define a standing wave having a predetermined frequency and wavenumber; and the predetermined wavenumber corresponds to a subacoustic wavelength for the predetermined frequency within the fluid flow.

4. A method as defined in claim 1 wherein:

the bending wave actuator is connected to the surface; and the predetermined pattern of bending wave oscillations is generated by bending one end of the surface at a predetermined wavelength.

5. A method as defined in claim 4 wherein the step of positioning a bending wave actuator relative to the surface comprises:

fixing a first piezoelectric material to the top of the surface;

fixing a second piezoelectric material to the bottom of the surface, said second piezoelectric material having a polarity substantially opposite a polarity of said first piezoelectric material; and wherein the step of energizing the bending wave actuator comprises:

applying a time-varying voltage to the first and second piezoelectric materials.

6. A method as defined in claim 5 wherein the wavevector of the bending wave extends at an angle of greater than 45 degrees with respect to the streamwise direction of the fluid flow.

7. A method as defined in claim 1 wherein:

the surface has a top and a bottom, and the fluid flow passes over the top surface;

the step of positioning the bending wave actuator relative to the surface comprises fixing piezoelectric material to the bottom of the surface; and the step of energizing the bending wave actuator comprises applying a time-varying voltage to the piezoelectric material.

8. A method as defined in claim 7 wherein:

the step of positioning the bending wave actuator relative to the surface further comprises fixing a second piezoelectric material to the bottom of the surface in addition to the piezoelectric material first aforesaid, said second piezoelectric material having a polarity substantially opposite a polarity of the first piezoelectric material; and the step of energizing the bending wave actuator further comprises applying a time-varying voltage to the first and second piezoelectric materials.

9. A method as defined in claim 1 further comprising the steps of:

fixing an external actuator to the top of the surface; and creating a bending wave within the external actuator.

10. A method as defined in claim 9 wherein the external actuator comprises a flexible strip, and the step of creating a bending wave within the external actuator comprises:

fixing a resilient spacer material to the top of the surface;

attaching the flexible strip to the resilient spacer material; and cyclically driving segments of the strip relative to the surface to establish a desired waveform within the strip.

11. A method as defined in claim 10 wherein piezoelectric forces are utilized to drive the segments of the strip relative to the surface.

12. A method as defined in claim 10 wherein electrostatic forces are utilized to drive the segments of the strip relative to the surface.

13. A method as defined in claim 10 wherein magnetic forces are utilized to drive the segments of the strip relative to the surface.

14. A method as defined in claim 10 wherein hydraulic forces are utilized to drive the segments of the strip relative to the surface.

15. A method as defined in claim 9 wherein the external actuator comprises a piezoelectric actuator including first and second sheets of piezoelectric material attached together, said first sheet of piezoelectric material having a polarity substantially opposite a polarity of said second sheet of piezoelectric material.

16. A method as defined in claim 15 further comprising:
fixing a resilient spacer material to the top of the surface; and
attaching the piezoelectric actuator to the resilient spacer material to allow displacement of the first and second sheets of piezoelectric material relative to the top of the surface upon application of a time-varying voltage to the first and second sheets of piezoelectric material.

17. A method as defined in claim 16 wherein the wavevector of the bending wave extends at an angle of greater than 45 degrees with respect to the streamwise direction of the fluid flow.

18. A method as defined in claim 16 further comprising:
attaching the second sheet of piezoelectric material to the resilient spacer material; and
fixing a flexible protective layer to the first sheet of piezoelectric material.

19. A method as defined in claim 16 wherein the resilient spacer material comprises an elastomer layer.

20. A method as defined in claim 16 wherein the resilient spacer material comprises a plurality of elastomer spacers aligned in a predominantly spanwise direction.

21. A method as defined in claim 9 wherein the external actuator comprises an electrostatic actuator including a resilient, electrically neutral strip having a lower portion and a plurality of electrodes distributed along said lower portion.

22. A method as defined in claim 21 further comprising:
applying an electrical charge to the top of the surface;
fixing a resilient spacer material to the top of the surface; and
attaching the lower portion of the electrically neutral strip to the resilient spacer material to allow displacement of the electrically neutral strip relative to the top of the surface upon application of an electric field to the plurality of electrodes on the lower portion of the strip, said electric field having a charge opposite the electrical charge applied to the top of the surface.

23. A method as defined in claim 22 wherein the wavevector of the bending wave extends at an angle of greater than 45 degrees with respect to the streamwise direction of the fluid flow.

24. A method as defined in claim 22 wherein the resilient spacer material comprises an elastomer layer.

25. A method as defined in claim 22 wherein the resilient spacer material comprises a plurality of elastomer spacers aligned in a predominantly spanwise direction.

26. A method as defined in claim 9 wherein a leading edge and a trailing edge of the external actuator are tapered.

27. A method as defined in claim 1 wherein:
the turbulent region of the boundary layer imparts a frictional drag force on the surface in the streamwise direction; and
the predetermined pattern of bending wave oscillations impose oscillations within the boundary layer which increase the streamwise frictional drag force from the turbulent region.

28. A method as defined in claim 1 wherein:
the surface has a top and a bottom, and the fluid flow passes over the top surface;
the fluid flow in the turbulent region of the boundary layer has a characteristic velocity gradient which accelerates from zero velocity at the top of the surface to a free stream velocity of the fluid flow; and
the predetermined pattern of bending wave oscillations impose oscillations within the boundary layer which decrease the magnitude of the velocity gradient of the fluid flow in the turbulent region adjacent the top of the surface.

29. A method as defined in claim 1 wherein:
the surface has a top and a bottom, and the fluid flow passes over the top surface;
the fluid flow in the turbulent region of the boundary layer has a characteristic velocity gradient which accelerates from zero velocity at the top of the surface to a free stream velocity of the fluid flow; and
the predetermined pattern of bending wave oscillations impose oscillations within the boundary layer which increase the magnitude of the velocity gradient of the fluid flow in the turbulent region adjacent the top of the surface.

30. A method as defined in claim 1 wherein:
the predetermined pattern of bending wave oscillations comprise a first bending wave portion having a first predetermined frequency and wavenumber and a second bending wave portion having a second predetermined frequency and wavenumber; and
combining the first bending wave portion with said second bending wave portion to form variable wavelength predetermined pattern of bending wave oscillations over substantially the entire spanwise dimension of the surface.

31. A method as defined in claim 30, wherein:
said first predetermined wavenumber represents a subacoustic wavelength for said first predetermined frequency within said fluid flow; and
said second predetermined wavenumber represents a subacoustic wavelength for said second predetermined frequency within said fluid flow.

32. A method as defined in claim 1 wherein the momentum transfer between the surface and the turbulent region of the boundary layer is reduced.

33. A method as defined in claim 1, wherein the momentum transfer between the surface and the turbulent region of the boundary layer is increased.

34. A method as defined in claim 1, wherein the step of positioning the bending wave actuator relative to the surface further comprises:
attaching the bending wave actuator to the surface within the turbulent region of the boundary layer.

35. A method as defined in claim 1 wherein the boundary layer includes a laminar region upstream of the turbulent region, and wherein the step of positioning the bending wave actuator relative to the surface further comprises:
attaching the bending wave actuator relative to the surface within the laminar region of the boundary layer; and wherein:
the imposed and maintained oscillations in the boundary layer prematurely trip the boundary layer to turbulent flow to increase the size of the turbulent region of the boundary layer.

* * * * *